(12) United States Patent
Frosio et al.

(10) Patent No.: US 12,711,382 B1
(45) Date of Patent: Aug. 18, 2026

(54) ADVERSARIAL NEURAL NETWORK TRAINING

(71) Applicant: NVIDIA Corporation, Santa Clara, CA (US)

(72) Inventors: Iuri Frosio, San Jose, CA (US); Pavlo Molchanov, Mountain View, CA (US); Wonmin Byeon, Santa Clara, CA (US); Marco Ciccone, Milan (IT)

(73) Assignee: NVIDIA Corporation, Santa Clara, CA (US)

( * ) Notice: Subject to any disclaimer, the term of this patent is extended or adjusted under 35 U.S.C. 154(b) by 1162 days.

(21) Appl. No.: 16/412,754

(22) Filed: May 15, 2019

(51) Int. Cl.
*G06N 3/084* (2023.01)
*G06N 3/045* (2023.01)
*G06N 3/047* (2023.01)
*G06V 20/58* (2022.01)

(52) U.S. Cl.
CPC ............. *G06N 3/084* (2013.01); *G06N 3/045* (2023.01); *G06N 3/047* (2023.01); *G06V 20/582* (2022.01)

(58) Field of Classification Search
CPC .... G06N 3/084; G06N 3/0454; G06N 3/0472; G06N 3/045; G06N 3/047; G06V 20/582
See application file for complete search history.

(56) References Cited

U.S. PATENT DOCUMENTS 9,538,925 B2 * 1/2017 Sharma ................ A61B 6/5217
11,195,277 B2 * 12/2021 Shanbhag ............ G06T 11/008
2019/0046068 A1 * 2/2019 Ceccaldi ................ A61B 5/055
2019/0096125 A1 * 3/2019 Schulter .................. G06T 7/194
2019/0385302 A1 * 12/2019 Ngo Dinh .............. G06N 3/094
2020/0090049 A1 * 3/2020 Aliper .................. G06K 9/6262
2020/0117863 A1 * 4/2020 Ha ................... G06K 19/07771
2020/0151503 A1 * 5/2020 Wang .................... G06F 18/214
2020/0285938 A1 * 9/2020 Kim ...................... G06F 18/217

OTHER PUBLICATIONS

Yuan X, He P, Zhu Q, Li X. Adversarial examples: Attacks and defenses for deep learning. IEEE transactions on neural networks and learning systems. Jan. 14, 2019;30(9):2805-24. (Year: 2019).*
Shi, Y., Chang, A.X., Wu, Z., Savva, M. and Xu, K., 2019. Hierarchy Denoising Recursive Autoencoders for 3D Scene Layout Prediction. arXiv preprint arXiv:1903.03757. (Year: 2019).*
Mizan CM, Chakraborty T, Karmakar S. Text Recognition using Image Processing. International Journal of Advanced Research in Computer Science. May 15, 2017;8(5) (Year: 2017).*
Lienhart R, Wernicke A. Localizing and segmenting text in images and videos. IEEE Transactions on circuits and systems for video technology. Apr. 2002;12(4):256-68. (Year: 2002).*

(Continued)

*Primary Examiner* — Oluwatosin Alabi
(74) *Attorney, Agent, or Firm* — Robert C. Kowert; Kowert, Hood, Munyon, Rankin & Goetzel, P.C.

(57) ABSTRACT

A neural network is trained to recognize an object based on a first portion trained adversarially and a second portion trained non-adversarially. During adversarial training, the first portion encodes input to a set of latent variables, and the second portion reconstructs the input by decoding the variables. The first portion is trained based on an error signal generated from the decoded output of the second portion, whose configuration is kept fixed during the adversarial training.

30 Claims, 10 Drawing Sheets

(56) References Cited

OTHER PUBLICATIONS

Lienhart R, Effelsberg W. Automatic text segmentation and text recognition for video indexing. Multimedia systems. Jan. 2000;8:69-81. (Year: 2000).*
Abbasi et al., "Robustness to Adversarial Examples Through an Ensemble of Specialists," ICLR, 2017, 9 pages.
Anil et al., "Sorting out Llipschitz Function Approximation," Nov. 13, 2018, 27 pages.
Anonymous "Radial Basis Feature Transformation to Arm CNNs Against Adversarial Attacks," ICLR, 2019, 10 pages.
Athalye et al., "Obfuscated Gradients Give a False Sense of Security: Circumventing Defenses to Adversarial Examples," Jul. 31, 2018, 12 pages.
Bontrager et al., "Deep Masterprint: Generating Fingerprints for Presentation Attacks," Oct. 3, 2017, 8 pages.
Ciccone et al., "A New Method for Adversarial Training," Dec. 3, 2018, 8 pages.
Cisse et al., "Parseval Networks: Improving Robustness to Adversarial Examples," May 2, 2017, 10 pages.
Cubank et al., "Intriguing Properties of Adversarial Examples," Nov. 8, 2017, 17 pages.
Frosst et al., DARCCC: Detecting Adversaries by Reconstruction from Class Conditional Capsules, Nov. 16, 2018, 13 pages.
Goodfellow et al., "Explaining and Harnessing Adversarial Examples," International Conference on Learning Representations, Mar. 20, 2015, 11 pages.
Gopalakrishnan et al., "Combating Adversarial Attacks Using Sparse Representations," Jul. 13, 2018, 4 pages.
He et al., "Adversarial Example Defenses: Ensembles of Weak Defenses are not Strong," Jun. 15, 2017, 11 pages.
Huster et al., "Limitations of the Lipschitz Constant as a Defense Against Adversarial Examples," Jul. 25, 2018, 14 pages.
IEEE, "IEEE Standard 754-2008 (Revision of IEEE Standard 754-1985): IEEE Standard for Floating-Point Arithmetic," Aug. 29, 2008, 70 pages.
Kurakin et al., "Adversarial Examples in the Physical World," Nov. 4, 2016, 13 pages.
Lamb et al., "Fortified Networks: Improving the Robustness of Deep Networks by Modeling the Manifold of Hidden Representations," Apr. 7, 2018, 11 pages.
Liu et al., "Decoupled Networks," CVPR, 2018, 9 pages.
Liu et al., Deep Hyperspherical Defense Against Adversarial Perturbations, ICLR, 2018, 16 pages.
Liu et al., "Deep Hyperspherical Learning," Nov. 27, 2017, 14 pages.
Ma et al., "Characterizing Adversarial Subspaces Using Local Intrinsic Dimensionality," ICLR, Mar. 14, 2018, 15 pages.
Miyato et al., "Spectral Normalization for Generative Adversarial Networks," International Conference on Learning Representations, Feb. 16, 2018, 26 pages.
Moosavi-Dezfooli et al., "Universal Adversarial Perturbations," Nov. 17, 2016, 11 pages.
Nguyen et al., "Deep Neural Networks are Easily Fooled: High Confidence Predictions for Unrecognizable Images," Dec. 18, 2014, 18 pages.
Oberman et al., "Lipschitz Regularized Deep Neural Networks Converge and Generalize," Oct. 3, 2018, 17 pages.
Papernot et al., "Technical Report on the cleverhans v2.1.0 Adversarial Examples Library," Jun. 27, 2018, 12 pages.
Ross et al., "Improving the Adversarial Robustness and Interpretability of Deep Neural Networks by Regularizing their Input Gradients," Paulson School of Engineering and Applied Sciences, 2017, 10 pages.
Shaham et al., "Defending against Adversarial Images using Basis Functions Transformations," Apr. 16, 2018, 12 pages.
Shazeer et al., "Outrageously Large Neural Networks: The Sparsely-Gated Mixture-of-Experts Layer," ICLR, Jan. 23, 2017, 19 pages.
Tramér et al., "The Space of Transferable Adversarial Examples," May 23, 2017, 15 pages.
Uesato et al., "Adversarial Risk and the Dangers of Evaluating Against Weak Attacks," Proceedings of the 35th International Conference on Machine Learning, 80, Jul. 2018, 10 pages.
Verma et al., "Manifold Mixup: Learning Better Representations by Interpolating Hidden States," Oct. 4, 2018, 21 pages.
Wang et al., "Defensive Dropout for Hardening Deep Neural Networks under Adversarial Attacks," Sep. 13, 2018, 8 pages.
Wong et al., Provable Defenses against Adversarial Examples via the Convex Outer Adversarial Polytope, Nov. 2, 2017, 24 pages.
Xu et al., "Feature Squeezing: Detecting Adversarial Examples in Deep Neural Networks," Dec. 5, 2017, 15 pages.
Zhao et al., "To Compress or not to Compress: Understanding the Interactions Between Adversarial Attacks and Neural Network Compression," Sep. 29, 2018, 10 pages.
Zheng et al., "Ring loss: Convex Feature Normalization for Face Recognition," Feb. 28, 2018, 9 pages.
Madry et al., "Towards Deep Learning Models Resistant to Adversarial Attacks," International Conference on Learning Representations, 2018, 23 pages.

* cited by examiner

ADVERSARIAL NEURAL NETWORK TRAINING

BACKGROUND

Deep neural networks, as well as other machine learning algorithms, may be used to solve a variety of problems, including classification and regression problems, using learning-based approaches. However, these learning-based approaches may sometimes be fooled by slight changes in input. Such deficiencies, unless addressed, may preclude the use of learning-based approaches in various fields.

DETAILED DESCRIPTION

Figure 1:
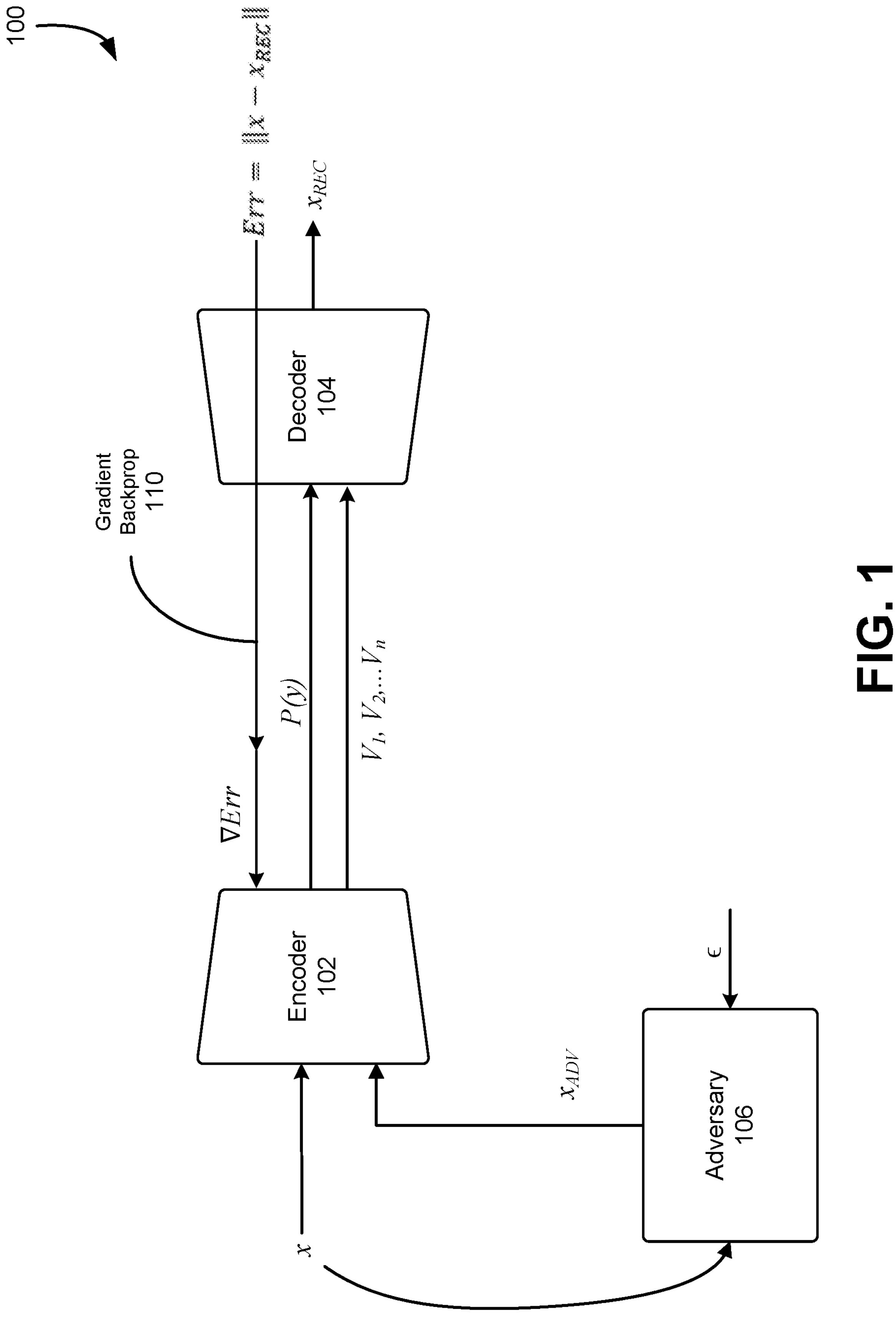
FIG. 1 illustrates an example of a neural network, in accordance with an embodiment.

In embodiments described herein, a neural network comprises a first portion that is trained with an adversarial process, based at least in part on the output of a second portion of the neural network that is trained non-adversarially. In an embodiment, the first portion is an encoder, and the second portion is a decoder. The decoder is trained with a primary dataset. The encoder is trained adversarially, based on an error signal generated from the output of the decoder.

In embodiments described herein, a deep neural network ("DNN") is trained to be resistant to adversarial attacks. An adversarial attack may be made by slightly modifying an input so as to obtain an output that is markedly different than the correct output that would have been arrived at without the modification. For example, an adversarial attack might involve tricking network trained to recognize traffic signs to confuse a "stop" sign with a "yield" sign, by placing a small strip of white tape on the stop sign. Although this difference is seemingly insignificant, a neural network whose internal representation of features comprises an irregular manifold may be vulnerable to these sorts of attacks. Embodiments of the present disclosure incorporate disclosed techniques for regularizing a manifold in the features space, thereby reducing vulnerability to adversarial attacks.

In an embodiment, a neural network is trained to be resistant to adversarial attacks by training an auto-encoder to map its input to points on a regularized manifold. Regularization of the manifold refers to a reduction in holes, defects, or other irregularities that might cause small changes in the network's input to produce disproportionately large changes in the network's output. In an embodiment, the regularization of the manifold is accomplished by adversarial training of the encoder portion of an auto-encoder, using an error signal generated from the output of the decoder portion of the auto-encoder. The decoder is pre-trained with non-adversarial input data and its configuration is not adjusted during the adversarial training.

In an embodiment, the adversarial training is based on adversarial examples. Adversarial examples may also be described as adversarial data or adversarial input. Training performed using adversarial examples may be described as adversarial training. In an embodiment, an adversarial example may be described as $x+\delta x$, where $x+\delta x$ is designed to differ as little as possible from the original input as x, according to some norm p. Adversarial examples may be created through a variety of techniques, and may even be created in the physical world, as was the case with the "stop sign" example described above.

In an embodiment, a system comprises a camera and a processor to identify a road sign in an image acquired by the camera, based on one or more neural networks comprising an adversarially trained portion, such as an encoder, and a non-adversarially trained portion, such as a decoder. The encoder and decoder are first trained non-adversarially, using correct images of road signs. The encoder is then adversarially trained with adversarial examples, guided by an error signal back-propagated and modulated by the decoder, whose configuration is kept constant during the adversarial training.

FIG. 1 illustrates an example of a neural network, in accordance with an embodiment. The neural network 100 of FIG. 1 is used during training, in an embodiment, to teach an encoder 102 to embed attributes of an input x into a regularized manifold that is resistant to adversarial attacks. Another neural network may use the encoder 102 to identify an object in an image with resistance to adversarial attacks.

In an embodiment, the encoder 102 and decoder 104 of the neural network 100 are first trained on primary data representing the objects that are to be identified. The primary data may also be described as original or clean data. As used herein, primary, or clean, data refers to the dataset on which the neural network is to be trained, as distinguished from adversarial data generated based on the primary dataset, or adversarial data generated by some other source. In an embodiment, an example of clean data is bitmap data representative of images of letters or numbers, such as bitmaps representing the digits "0" through "9."

In an embodiment, the encoder 102, which may also be referred to as or comprise a classifier, encodes input data x to a set of latent variables. In FIG. 1, these latent variables are depicted as P(y) and $V_1, V_2 \ldots V_n$, where P(y) comprises one or more variables indicative of probabilities of class membership and $V_1, V_2 \ldots V_n$ are some number of additional latent variables indicative of other aspects of the input data, such as appearance. The variables $V_1, V_2 \ldots V_n$ may be referred to, in cases and embodiments, as appearance codes.

In an embodiment, the probabilities P(y) comprises values indicative of probability of membership in a respective class. For example, with respect to an input set comprising images of the digits "0" to "9," the probabilities P(y) might be an array or vector of ten values, indicating the respective probability that an input corresponds to a respective digit. In embodiments, the probabilities P(y) are one or more logits. These examples are intended to be illustrative, and as such should not be construed so as to limit the scope of the present disclosure to only those embodiments which include the specific example provided.

In an embodiment, the appearance codes $V_1, V_2 \ldots V_n$ are variables used to describe aspects of the input, such as shifting, rotation, scale, skew, color, style, size, and so on. These examples are intended to be illustrative, and as such should not be construed so as to limit the scope of the present disclosure to only those embodiments which include the specific example provided.

In an embodiment, the decoder 104 is trained, with the clean data, to reconstruct input data based on the latent variables P(y) and $V_1, V_2 \ldots V_n$. The encoder and decoder may be trained, in an embodiment, to minimize a loss function:

$$(\text{classification loss})+\lambda\cdot(\text{reconstruction loss})$$

In an embodiment classification loss is used to fix the classification loss to its target, an a constrained optimization is performed. For example, a Lagrange multiplier may be used to fix the classification loss to its target, and minimize the reconstruction loss under this constraint.

In an embodiment, the decoder 104 is trained, on the primary classifications, according to the equation $\min \Sigma\|x_{REC}-x\|_2$. Here, the primary classifications are those that the neural network is being trained to recognize, rather than adversarial images used to trick the neural network.

In an embodiment, an adversary 106, which may also be referred to as an attacker, is used during an adversarial training stage to produce adversarial data $x_{ADV}$. The adversary may be any of a variety of modules or data source capable of generating or providing adversarial data. For example, the adversary 106 can be a fixed attacker, such as a fast gradient sign method ("FGSM") attacker, an iterative attacker such as though based on basic iterative method ("BIM"), or a GAN-based adversarial attacker. These examples are intended to be illustrative, and as such should not be construed so as to limit the scope of the present disclosure to only those embodiments which include the specific examples provided.

In an embodiment, during adversarial training the adversary 106 supplies adversarial data to the encoder 102. The adversarial data, indicated in FIG. 1 as $X_{ADV}$, is encoded into the latent variables P(y) and $V_1, V_2 \ldots V_n$, and then reconstructed by the decoder 104.

In an embodiment, the adversarial training causes the neural network 100 to be resistant to adversarial attacks up to a magnitude c.

In an embodiment, an error signal $Err=\|x-x_{REC}\|$ is back-propagated through the decoder 104 to the encoder 102. Note, however, that the configuration of the decoder 104 is fixed during the adversarial training, and consequently is not adjusted based on the back-propagated signal. This may help prevent an adversary from learning to fool the decoder. In these and other embodiments, embodiments, the error signal is also modulated by the decoder 104.

In an embodiment, the error signal may be a p-norm or other function that is able to measure the reconstruction error.

In an embodiment, the structure depicted in FIG. 1 may have the advantage of causing data to lie on the correct manifold after passing through the decoder. Under attack, an error is generated because the decoder reconstructs the input as something different than the adversarial input. The differences between the reconstructed input and the adversarial input suggests to the encoder where to concentrate its attention. This may result, in embodiments, in regularization of a manifold learned by the network 100.

In an embodiment, the error between the input image and the reconstruction by the decoder 104 may be used as a detector of adversarial attacks. In an embodiment, an adversarial attack may be detected according to the constraint $\|x_{REC}-x_{ADV}\|_2>\text{Threshold}$.

In an embodiment, an adversarial attack may be detected by a neural network trained with input $x_{REC}$ and $x_{ADV}$, and with an output to indicate an attack.

Figure 2:
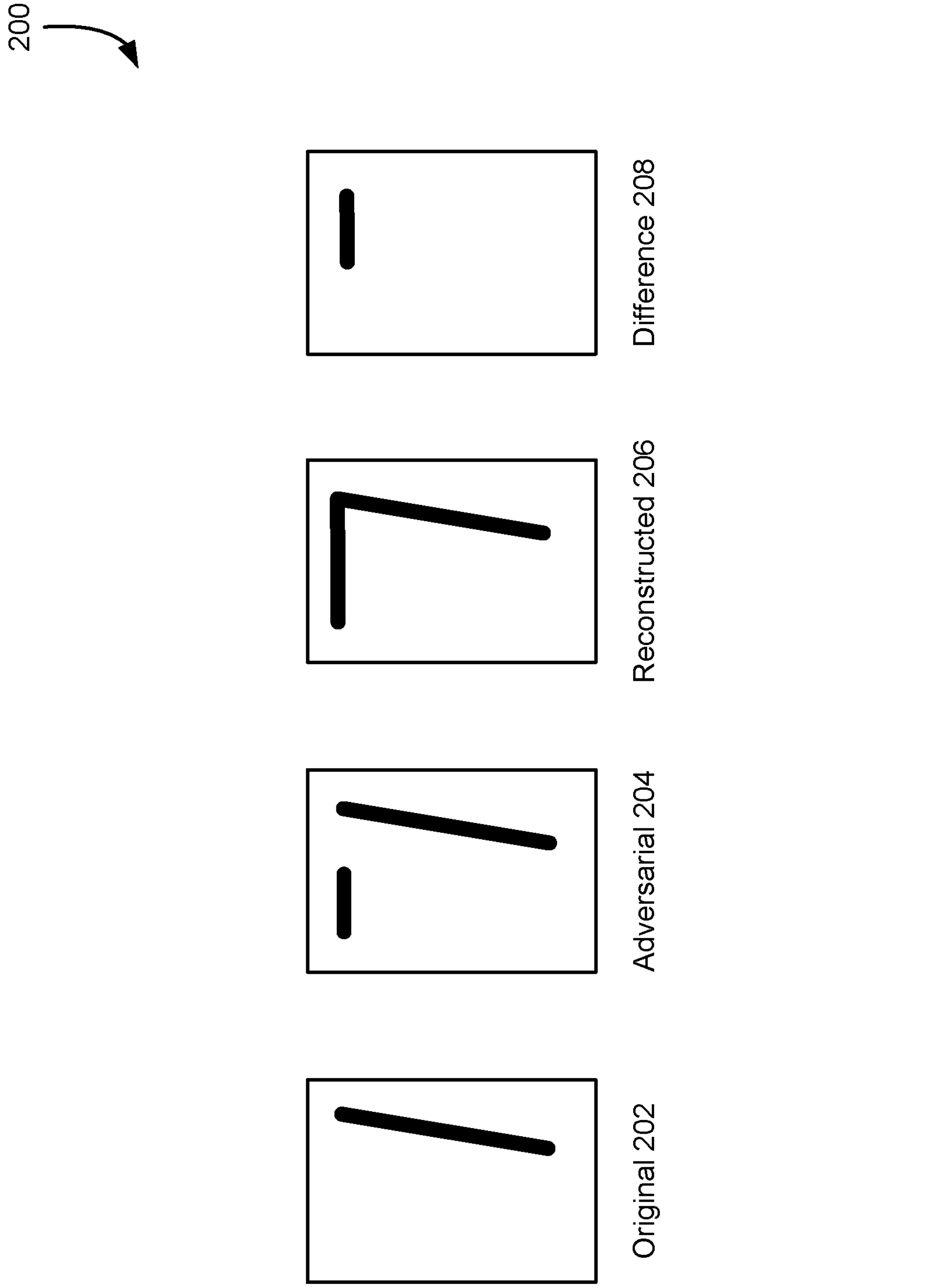
FIG. 2 illustrates example aspects of adversarial training data, in accordance with an embodiment.

FIG. 2 illustrates example aspects of adversarial training data, in accordance with an embodiment. The example 200 of FIG. 2 depicts aspects of an example based on image recognition. Specifically, the example 200 involves an original or "clean" image 202 of the digit "1." An adversarial attack on the original image 202 might be presented as an adversarial image 204 in which an additional marking has been made. In the example 200, the marking suggests that the image, rather than being of a "1," is of a "7." A decoder trained on the original, non-adversarial data might therefore produce a reconstructed image 206 of a "7." An error signal generated might therefore be based on the difference 208 between the adversarial image 204 and the reconstructed image 206. As depicted in FIG. 2, this difference provides information regarding the nature of the adversarial attack, and suggests to the encoder which features are distinguishing between the original 202, adversarial 204, and reconstructed 206 images. This information helps the network 100 to learn a regularized manifold. For example, the difference 208 highlights the missing part to classify the input as a "7" when the correct answer is a "1." This tells the network to focus its attention on this part of the image when discriminating between "1" and "7," and thereby may cause the representation of the classes in the manifold to have greater continuity.

Figure 3:
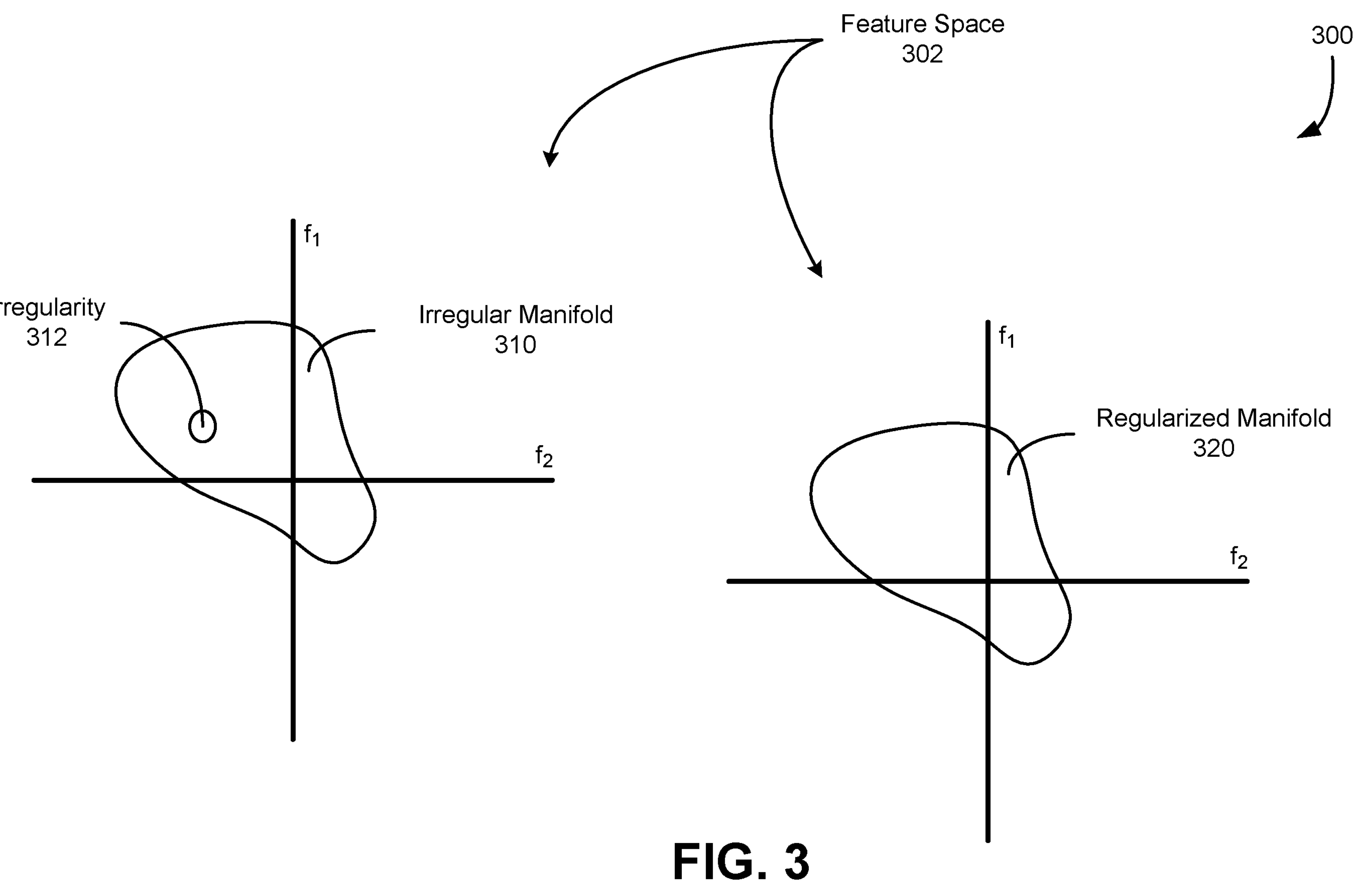
FIG. 3 illustrates regularization of a manifold, in accordance with an embodiment.

FIG. 3 illustrates regularization of a manifold, in accordance with an embodiment. As depicted in the example 300, manifolds may be projected or mapped into a feature space 302. Although depicted as two-dimensional spaces in FIG. 3, a feature space 302 may have any number of dimensions. In an embodiment, the feature space comprises dimensions corresponding to one or more probabilities or logits, and one or more appearance codes.

In an embodiment, a manifold in the feature space 302 is associated with a classification. For example, in scenario similar to the one depicted in relation to FIG. 2, an encoder might embed input data onto a point of a manifold associated with the digit "1." However, an irregular manifold 310 may include an irregularity 312. The depicted irregularity might be described as a hole in the manifold, although manifolds may be irregular in other ways, such as by having ragged borders or neighboring manifolds associated with dissimilar classifications. Another example of an irregularity may be seen when the boundary of a class is irregular and in the vicinity of another class, such as when the boundary of a class is a narrow protuberance. The irregularities may cause a relatively small change in input to produce an undesirably large change in output. For example, a small change in input might cause an encoder to point to an area inside of the irregularity 312, rather than within the manifold 310.

In an embodiment, manifold regularization involves reducing or eliminating manifold irregularities. In the example 300, a regularized version of the irregular manifold 310 might contain no irregularities, and as such the regularized manifold 320 might lack the depicted irregularity 312. In some cases and embodiments, manifold irregularities are minimized rather than eliminated. For example, the size of a hole in the manifold might be made to shrink, or the boundaries of the manifold made more regular.

In an embodiment, manifold regularization occurs at least in part during adversarial training of an encoder. The regularization occurs during this training while the configuration of a corresponding decoder, having been trained earlier with non-adversarial training process, kept constant.

Figure 4:
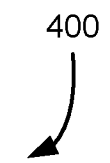
FIG. 4 illustrates an example procedure for training a neural network, in accordance with an embodiment.
Figure 4:
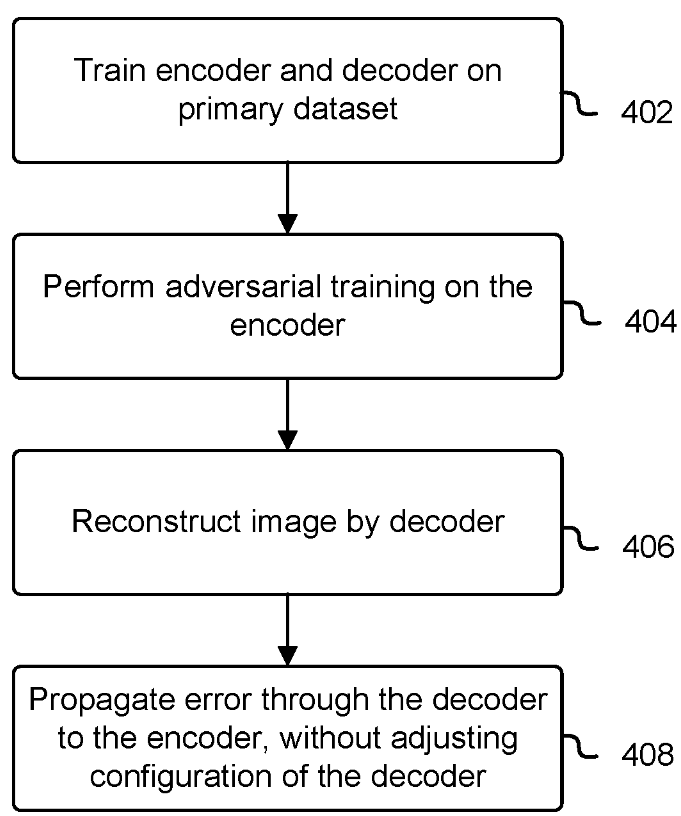

FIG. 4 illustrates an example procedure for training a neural network, in accordance with an embodiment. Although the example process 400 is depicted as a sequence of operations, it will be appreciated that, in embodiments, the depicted operations may be altered in various ways, and that some operations may be omitted, reordered, or performed in parallel with other operations, except where an order is explicitly stated or logically implied, such as when the input from one operation depends upon the output of another operation. The example procedure 400 may be performed by a variety of computing devices and components thereof, such as those depicted in FIGS. 6-10.

In an embodiment, at 402, the encoder and decoder of a neural network are trained on a primary dataset. Here, primary dataset refers to data the neural network is being trained to classify or regress, rather than to any adversarial data that might be generated based on the primary dataset. For example, the primary dataset might comprise images of road signs that the neural network is being trained to identify. The primary dataset might may also be described as original or clean data. The use of the terms real, original, or clean should not, however, be construed to limit various forms of processing which might be applied to the dataset prior to training.

In an embodiment, the encoder is trained to encode the input data into a set of latent variables, and the decoder is trained to reconstruct the input data from the latent variables. The encoder and decoder may be described, in some embodiments, as an autoencoder.

In an embodiment, the encoder is made more resistant to adversarial attacks based at least in part on the error signal generated from the output of the decoder. Because the decoder knows to reconstruct images close to the original images, the error signal may contain data which describes the difference between an original image and an adversarial example. For example, with respect to FIG. 2, an adversarial example 204 based on an original image 202 of the digit "1" might be decoded as a reconstructed image 206 of the digit "7." The error signal might then describe the difference 208 between the adversarial example 204 and a real "7," and thereby suggest the encoder to focus on this difference. The error signal, in an embodiment, is demodulated by the decoder and back-propagated to the encoder, thus forcing the neural network to learn an inner representation of the data that lies on a regular manifold.

In an embodiment, at 404, the encoder is further trained with adversarial data. As described herein, the adversarial data may be generated through a variety of means, including but not limited to GSM, BIM, or GAN-based methods.

In an embodiment, at 406, an adversarial image embedded by the encoder into a set of latent variables is reconstructed by the decoder. The decoder, having been trained on non-adversarial data, emits data lying on a manifold defining a region of the latent space associated with real input. Then, at 408, an error based on the reconstructed output is propagated back through the decoder, which can modulate the error signal, to the encoder. In an embodiment, the encoder is made more resistant to adversarial attacks based at least in part on adversarial training adjustments that are computed for the encoder only. The configuration of the decoder is fixed, or in other words remains constant, during the adversarial training.

Figure 5:
FIG. 5 illustrates aspects of an example procedure for training a neural network, in accordance with an embodiment.
Figure 5:
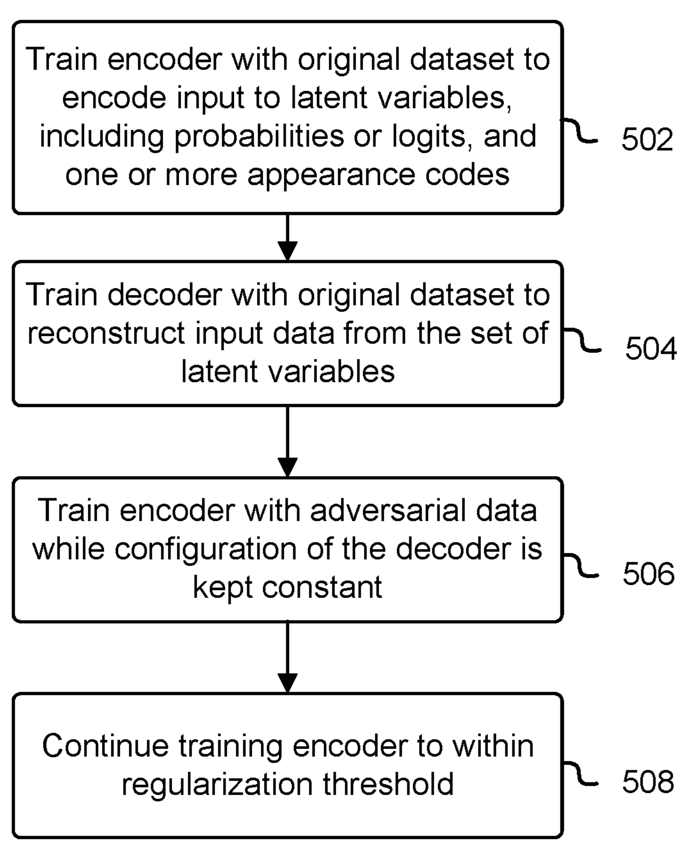

FIG. 5 illustrates further aspects of an example procedure for training a neural network, in accordance with an embodiment. Although the example process 500 is depicted as a sequence of operations, it will be appreciated that, in embodiments, the depicted operations may be altered in various ways, and that some operations may be omitted, reordered, or performed in parallel with other operations, except where an order is explicitly stated or logically implied, such as when the input from one operation depends upon the output of another operation. The example procedure 500 may be performed by a variety of computing devices and components thereof, such as those depicted in FIGS. 6-10.

In an embodiment, at 502, an encoder is trained with non-adversarial data to encode input data to a set of latent variables. In an embodiment, these include P(y) and $V_1$, $V_2$ . . . . In, as described above, representing probabilities or logits and a set of appearance codes. In an embodiment, P(y) refers to semantic information about input, and $V_1$, $V_2$ . . . . $V_n$ refer to information about appearance, such as color, size, shifting, rotation, and so on.

In an embodiment, at 504, the decoder is trained with the non-adversarial data to reconstruct the input data based on the set of latent variables P(y) and $V_1$, $V_2$ . . . . $V_n$. The encoder and decoder, in an embodiment, are trained together. For example, the encoder and decoder portions of an autoencoder may be trained simultaneously with non-adversarial data.

In an embodiment, the training of the encoder and decoder is based on a minimization of a weighted sum of classification loss and reconstruction loss.

In an embodiment, at 506, the encoder is further trained with adversarial data, while the configuration of the decoder is kept constant. During this training, the encoder is trained to be resistant against adversarial attacks by adjusting its configuration based on an error signal generated based on the output of the encoder, which was trained non-adversarially and whose configuration is not adjusted during the adversarial training. An error based on the decoder's output is back-propagated through the decoder to the encoder. The encoder's configuration is then adjusted, so as to cause the neural network to learn an inner representation of the data that lies on a regular manifold.

In an embodiment, at 508, training of the encoder continues until a regularization threshold is met. For example, in this and other embodiments, Lipschitz regularization, interval bound propagation, or other regularization techniques are used to train the network to be resistant to attacks having e smaller than a given threshold.

In an embodiment, a processor comprises one or more arithmetic logic units (ALUs) to identify an object in an image based on one or more neural networks. The processor may, for example, correspond to the multi-processor 900 depicted in FIG. 9, although this example should not be construed as limiting the scope of the present disclosure to only those embodiments that conform to this specific example. The neural networks include one or more non-adversarially trained portions and one or more adversarially trained portions. The adversarially trained portions are trained using output of the non-adversarially trained portions, whose configuration is fixed during the adversarial training.

In an embodiment, a processor comprises one or more floating point logic units (FLUs) to identify an object in an image based on one or more neural networks. The neural networks include one or more non-adversarially trained portions and one or more adversarially trained portions. The adversarially trained portions are trained using output of the non-adversarially trained portions, whose configuration is fixed during the adversarial training.

In an embodiment, the adversarially trained portions correspond to an encoder, and the non-adversarially trained portions correspond to a decoder. The adversarially trained portions may be pre-trained with the non-adversarially trained portions. For example, in an embodiment, an encoder is trained by a combination of adversarial and non-adversarial training. However, the decoder is not adversarially trained.

In an embodiment, the adversarially trained portions, e.g., the encoder, map input data to a set of latent variables comprising a probability variable and an appearance variable.

In an embodiment, the adversarially trained portions are trained using an error signal calculated from the output of the non-adversarially trained portions. For example, during adversarial training, the encoder is trained by an error signal backpropagated through the decoder, whose configuration is kept fixed during the adversarial training. The error signal is calculated, in an embodiment, based on the difference between an adversarially generated input and a reconstruction of that input by the non-adversarially trained portions.

In an embodiment, the neural networks learn a regularized manifold as an internal representation of data in a feature space. The manifold is regularized based on the constraints imposed by the error signal. Because the non-adversarially trained portion, e.g., the decoder, is trained to reconstruct examples based on the primary dataset, the resulting error signal highlights differences between the primary examples and the adversarial examples, and suggests to the adversarially trained portions, e.g., the encoder, where attention should be concentrated.

In an embodiment, a system comprises one or more processors to train one or more neural networks to identify an object in an image. The neural networks comprises an adversarially trained portion, and a non-adversarially trained portion whose output is used to train the adversarially trained portions.

In an embodiment, a machine-readable medium has stored thereon a set of instructions which, if performed by one or more processors, cause the one or more processors to cause a neural network to be trained to identify an object in an image. The neural networks comprises an adversarially trained portion, and a non-adversarially trained portion whose output is used to train the adversarially trained portions. For example, an application framework or application programming interface ("API") may be provided to facilitate training of one or more neural networks in the manner described.

In an embodiment, a processor comprises one or more arithmetic logic units (ALUs) to perform a machine learning task based, at least in part, on an encoder trained to map input to a regularized manifold, where the encoder is trained to do so based at least in part on adversarial input and a reconstruction of the input by a decoder trained with non-adversarial input, e.g. by the primary dataset. The configuration of the decoder is not adjusted by the adversarial training of the encoder.

In an embodiment, one or more computers including one or more processors to train an encoder to map input to a regularized manifold, the encoder trained based at least in part on adversarial input and a reconstruction of the input by a decoder trained non-adversarially. The configuration of the decoder is not adjusted by the adversarial training of the encoder.

In an embodiment, a system comprises a camera and a processor to identify a road sign in an image acquired by the camera. The identification is performed based on one or more neural networks comprising an adversarially trained portion, such as an encoder, and a non-adversarially trained portion, such as a decoder. During training, the encoder and decoder are first trained non-adversarially, using a variety of images of the road signs that are to be recognized. The encoder is then adversarially trained with adversarial data generated from the original images. During adversarial training, the parameters of the encoder are adjusted based on an error signal back-propagated and modulated by the decoder, whose configuration is kept constant during the adversarial training.

Figure 6:
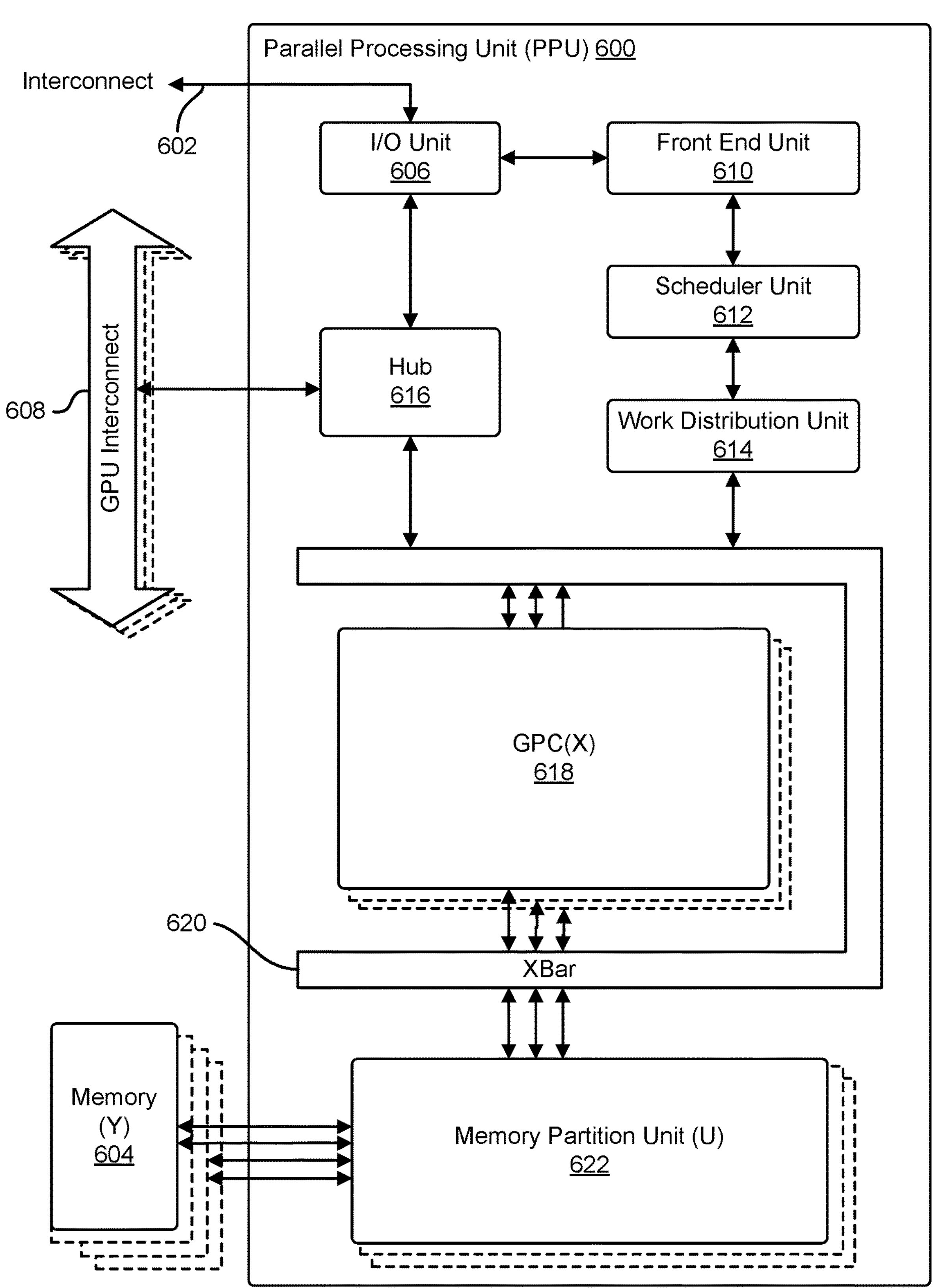
FIG. 6 illustrates an example of parallel processing unit ("PPU"), in accordance with an embodiment.

FIG. 6 illustrates a parallel processing unit ("PPU") 600, in accordance with one embodiment. In an embodiment, the PPU 600 is configured with machine-readable code that, if executed by the PPU, causes the PPU to perform some or all of processes and techniques described throughout this disclosure. In an embodiment, the PPU 600 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In an embodiment, a thread refers to a thread of execution and is an instantiation of a set of instructions configured to be executed by the PPU 600. In an embodiment, the PPU 600 is a graphics processing unit ("GPU") configured to implement a graphics rendering pipeline for processing three-dimensional ("3D") graphics data in order to generate two-dimensional ("2D") image data for display on a display device such as a liquid crystal display (LCD) device. In an embodiment, the PPU 600 is utilized to perform computations such as linear algebra operations and machine-learning operations. FIG. 6 illustrates an example parallel processor for illustrative purposes only and should be construed as a non-limiting example of processor architectures contemplated within the scope of this disclosure and that any suitable processor may be employed to supplement and/or substitute for the same.

In an embodiment, one or more PPUs are configured to accelerate High Performance Computing ("HPC"), data center, and machine learning applications. In an embodiment, the PPU 600 is configured to accelerate deep learning systems and applications including the following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In an embodiment, the PPU 600 includes an Input/Output ("I/O") unit 606, a front-end unit 610, a scheduler unit 612, a work distribution unit 614, a hub 616, a crossbar ("Xbar") 620, one or more general processing clusters ("GPCs") 618, and one or more partition units 622. In an embodiment, the PPU 600 is connected to a host processor or other PPUs 600 via one or more high-speed GPU interconnects 608. In an embodiment, the PPU 600 is connected to a host processor or other peripheral devices via an interconnect 602. In an embodiment, the PPU 600 is connected to a local memory comprising one or more memory devices 604. In an embodiment, the local memory comprises one or more dynamic random access memory ("DRAM") devices. In an embodiment, the one or more DRAM devices are configured and/or configurable as high-bandwidth memory ("HBM") subsystems, with multiple DRAM dies stacked within each device.

The high-speed GPU interconnect 608 may refer to a wire-based multi-lane communications link that is used by systems to scale and include one or more PPUs 600 combined with one or more CPUs, supports cache coherence between the PPUs 600 and CPUs, and CPU mastering. In an embodiment, data and/or commands are transmitted by the high-speed GPU interconnect 608 through the hub 616 to/from other units of the PPU 600 such as one or more copy engines, video encoders, video decoders, power management units, and other components which may not be explicitly illustrated in FIG. 6.

In an embodiment, the I/O unit 606 is configured to transmit and receive communications (e.g., commands, data) from a host processor (not illustrated in FIG. 6) over the system bus 602. In an embodiment, the I/O unit 606 communicates with the host processor directly via the system bus 602 or through one or more intermediate devices such as a memory bridge. In an embodiment, the I/O unit 606 may communicate with one or more other processors, such as one or more of the PPUs 600 via the system bus 602. In an embodiment, the I/O unit 606 implements a Peripheral Component Interconnect Express ("PCIe") interface for communications over a PCIe bus. In an embodiment, the I/O unit 606 implements interfaces for communicating with external devices.

In an embodiment, the I/O unit 606 decodes packets received via the system bus 602. In an embodiment, at least some packets represent commands configured to cause the PPU 600 to perform various operations. In an embodiment, the I/O unit 606 transmits the decoded commands to various other units of the PPU 600 as specified by the commands. In an embodiment, commands are transmitted to the front-end unit 610 and/or transmitted to the hub 616 or other units of the PPU 600 such as one or more copy engines, a video encoder, a video decoder, a power management unit, etc. (not explicitly illustrated in FIG. 6). In an embodiment, the I/O unit 606 is configured to route communications between and among the various logical units of the PPU 600.

In an embodiment, a program executed by the host processor encodes a command stream in a buffer that provides workloads to the PPU 600 for processing. In an embodiment, a workload comprises instructions and data to be processed by those instructions. In an embodiment, the buffer is a region in a memory that is accessible (e.g., read/write) by both the host processor and the PPU 600—the host interface unit may be configured to access the buffer in a system memory connected to the system bus 602 via memory requests transmitted over the system bus 602 by the I/O unit 606. In an embodiment, the host processor writes the command stream to the buffer and then transmits a pointer to the start of the command stream to the PPU 600 such that the front-end unit 610 receives pointers to one or more command streams and manages the one or more streams, reading commands from the streams and forwarding commands to the various units of the PPU 600.

In an embodiment, the front-end unit 610 is coupled to a scheduler unit 612 that configures the various GPCs 618 to process tasks defined by the one or more streams. In an embodiment, the scheduler unit 612 is configured to track state information related to the various tasks managed by the scheduler unit 612 where the state information may indicate which GPC 618 a task is assigned to, whether the task is active or inactive, a priority level associated with the task, and so forth. In an embodiment, the scheduler unit 612 manages the execution of a plurality of tasks on the one or more GPCs 618.

In an embodiment, the scheduler unit 612 is coupled to a work distribution unit 614 that is configured to dispatch tasks for execution on the GPCs 618. In an embodiment, the work distribution unit 614 tracks a number of scheduled tasks received from the scheduler unit 612 and the work distribution unit 614 manages a pending task pool and an active task pool for each of the GPCs 618. In an embodiment, the pending task pool comprises a number of slots (e.g., 32 slots) that contain tasks assigned to be processed by a particular GPC 618; the active task pool may comprise a number of slots (e.g., 4 slots) for tasks that are actively being processed by the GPCs 618 such that as a GPC 618 completes the execution of a task, that task is evicted from the active task pool for the GPC 618 and one of the other tasks from the pending task pool is selected and scheduled for execution on the GPC 618. In an embodiment, if an active task is idle on the GPC 618, such as while waiting for a data dependency to be resolved, then the active task is evicted from the GPC 618 and returned to the pending task pool while another task in the pending task pool is selected and scheduled for execution on the GPC 618.

In an embodiment, the work distribution unit 614 communicates with the one or more GPCs 618 via XBar 620. In an embodiment, the XBar 620 is an interconnect network that couples many of the units of the PPU 600 to other units of the PPU 600 and can be configured to couple the work distribution unit 614 to a particular GPC 618. Although not shown explicitly, one or more other units of the PPU 600 may also be connected to the XBar 620 via the hub 616.

The tasks are managed by the scheduler unit 612 and dispatched to a GPC 618 by the work distribution unit 614. The GPC 618 is configured to process the task and generate results. The results may be consumed by other tasks within the GPC 618, routed to a different GPC 618 via the XBar 620, or stored in the memory 604. The results can be written to the memory 604 via the partition units 622, which implement a memory interface for reading and writing data to/from the memory 604. The results can be transmitted to another PPU 600 or CPU via the high-speed GPU interconnect 608. In an embodiment, the PPU 600 includes a number U of partition units 622 that is equal to the number of separate and distinct memory devices 604 coupled to the PPU 600. A partition unit 622 will be described in more detail below in conjunction with FIG. 8.

In an embodiment, a host processor executes a driver kernel that implements an application programming interface ("API") that enables one or more applications executing on the host processor to schedule operations for execution on the PPU 600. In an embodiment, multiple compute applications are simultaneously executed by the PPU 600 and the PPU 600 provides isolation, quality of service ("QoS"), and independent address spaces for the multiple compute applications. In an embodiment, an application generates instructions (e.g., in the form of API calls) that cause the driver kernel to generate one or more tasks for execution by the PPU 600 and the driver kernel outputs tasks to one or more streams being processed by the PPU 600. In an embodiment, each task comprises one or more groups of related threads, which may be referred to as a warp. In an embodiment, a warp comprises a plurality of related threads (e.g., 32 threads) that can be executed in parallel. In an embodiment, cooperating threads can refer to a plurality of threads including instructions to perform the task and that exchange data through shared memory. Threads and cooperating threads are described in more detail, in accordance with one embodiment, in conjunction with FIG. 8.

Figure 7:
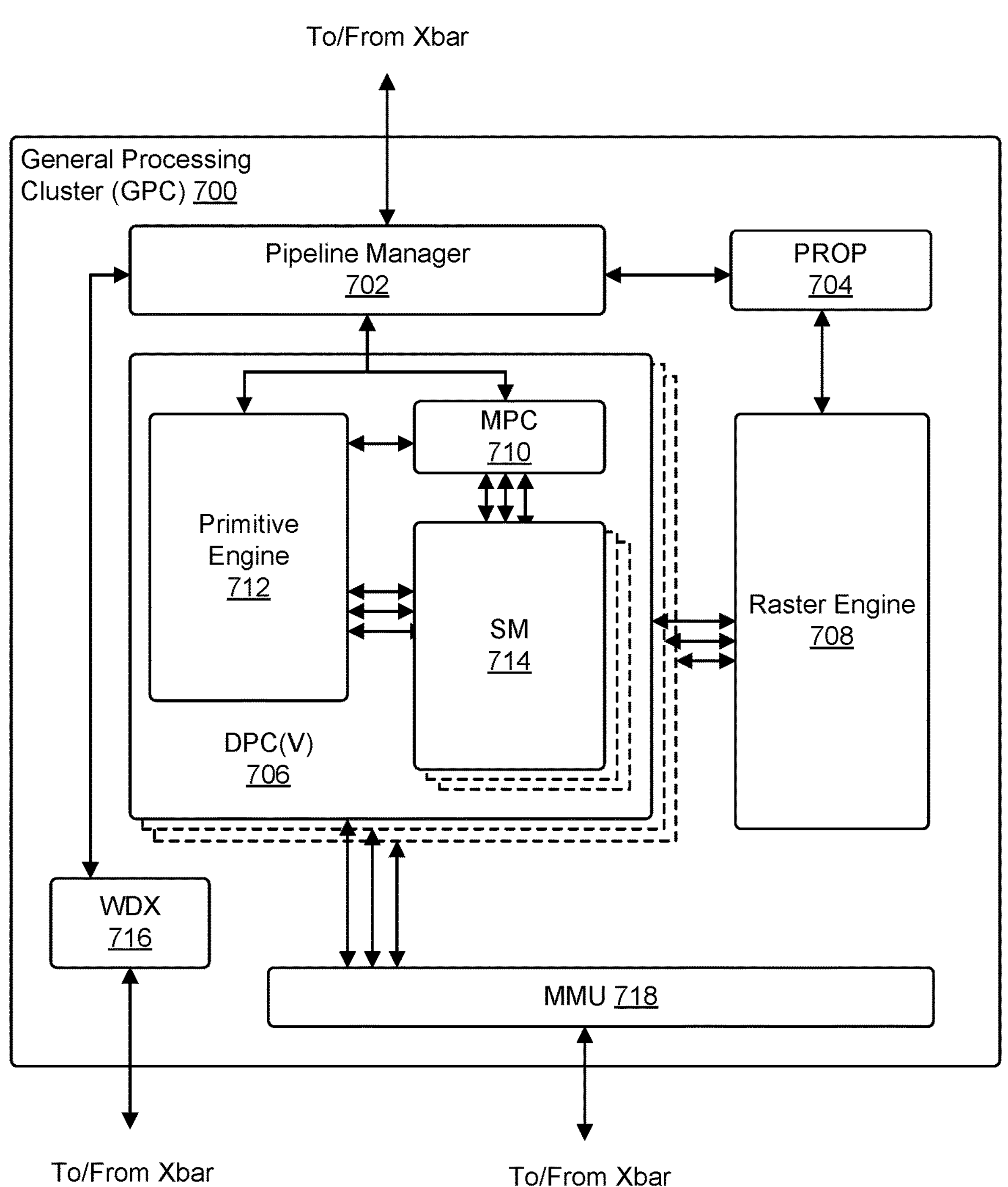
FIG. 7 illustrates an example of a general processing cluster ("GPC"), in accordance with one embodiment.

FIG. 7 illustrates a GPC 700 such as the GPC illustrated of the PPU 600 of FIG. 6, in accordance with one embodiment. In an embodiment, each GPC 700 includes a number of hardware units for processing tasks and each GPC 700 includes a pipeline manager 702, a pre-raster operations unit ("PROP") 704, a raster engine 708, a work distribution crossbar ("WDX") 716, a memory management unit ("MMU") 718, one or more Data Processing Clusters ("DPCs") 706, and any suitable combination of parts. It will be appreciated that the GPC 700 of FIG. 7 may include other hardware units in lieu of or in addition to the units shown in FIG. 7.

In an embodiment, the operation of the GPC 700 is controlled by the pipeline manager 702. The pipeline manager 702 manages the configuration of the one or more DPCs 706 for processing tasks allocated to the GPC 700. In an embodiment, the pipeline manager 702 configures at least one of the one or more DPCs 706 to implement at least a portion of a graphics rendering pipeline. In an embodiment, a DPC 706 is configured to execute a vertex shader program on the programmable streaming multiprocessor ("SM") 714. The pipeline manager 702 is configured to route packets received from a work distribution to the appropriate logical units within the GPC 700, in an embodiment, and some packets may be routed to fixed function hardware units in the PROP 704 and/or raster engine 708 while other packets may be routed to the DPCs 706 for processing by the primitive engine 712 or the SM 714. In an embodiment, the pipeline manager 702 configures at least one of the one or more DPCs 706 to implement a neural network model and/or a computing pipeline.

The PROP unit 704 is configured, in an embodiment, to route data generated by the raster engine 708 and the DPCs 706 to a Raster Operations ("ROP") unit in the memory partition unit, described in more detail above. In an embodiment, the PROP unit 704 is configured to perform optimizations for color blending, organize pixel data, perform address translations, and more. The raster engine 708 includes a number of fixed function hardware units configured to perform various raster operations, in an embodiment, and the raster engine 708 includes a setup engine, a coarse raster engine, a culling engine, a clipping engine, a fine raster engine, a tile coalescing engine, and any suitable combination thereof. The setup engine, in an embodiment, receives transformed vertices and generates plane equations associated with the geometric primitive defined by the vertices; the plane equations are transmitted to the coarse raster engine to generate coverage information (e.g., an x, y coverage mask for a tile) for the primitive; the output of the coarse raster engine is transmitted to the culling engine where fragments associated with the primitive that fail a z-test are culled, and transmitted to a clipping engine where fragments lying outside a viewing frustum are clipped. In an embodiment, the fragments that survive clipping and culling are passed to the fine raster engine to generate attributes for the pixel fragments based on the plane equations generated by the setup engine. In an embodiment, the output of the raster engine 708 comprises fragments to be processed by any suitable entity such as by a fragment shader implemented within a DPC 706.

In an embodiment, each DPC 706 included in the GPC 700 comprises an M-Pipe Controller ("MPC") 710; a primitive engine 712; one or more SMs 714; and any suitable combination thereof. In an embodiment, the MPC 710 controls the operation of the DPC 706, routing packets received from the pipeline manager 702 to the appropriate units in the DPC 706. In an embodiment, packets associated with a vertex are routed to the primitive engine 712, which is configured to fetch vertex attributes associated with the vertex from memory; in contrast, packets associated with a shader program may be transmitted to the SM 714.

In an embodiment, the SM 714 comprises a programmable streaming processor that is configured to process tasks represented by a number of threads. In an embodiment, the SM 714 is multi-threaded and configured to execute a plurality of threads (e.g., 32 threads) from a particular group of threads concurrently and implements a SIMD (Single-Instruction, Multiple-Data) architecture where each thread in a group of threads (e.g., a warp) is configured to process a different set of data based on the same set of instructions. In an embodiment, all threads in the group of threads execute the same instructions. In an embodiment, the SM 714 implements a SIMT (Single-Instruction, Multiple Thread) architecture wherein each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. In an embodiment, execution state is maintained for each individual thread and threads executing the same instructions may be converged and executed in parallel for better efficiency. In an embodiment, the SM 714 is described in more detail below.

In an embodiment, the MMU 718 provides an interface between the GPC 700 and the memory partition unit and the MMU 718 provides translation of virtual addresses into physical addresses, memory protection, and arbitration of memory requests. In an embodiment, the MMU 718 provides one or more translation lookaside buffers ("TLBs") for performing translation of virtual addresses into physical addresses in memory.

Figure 8:
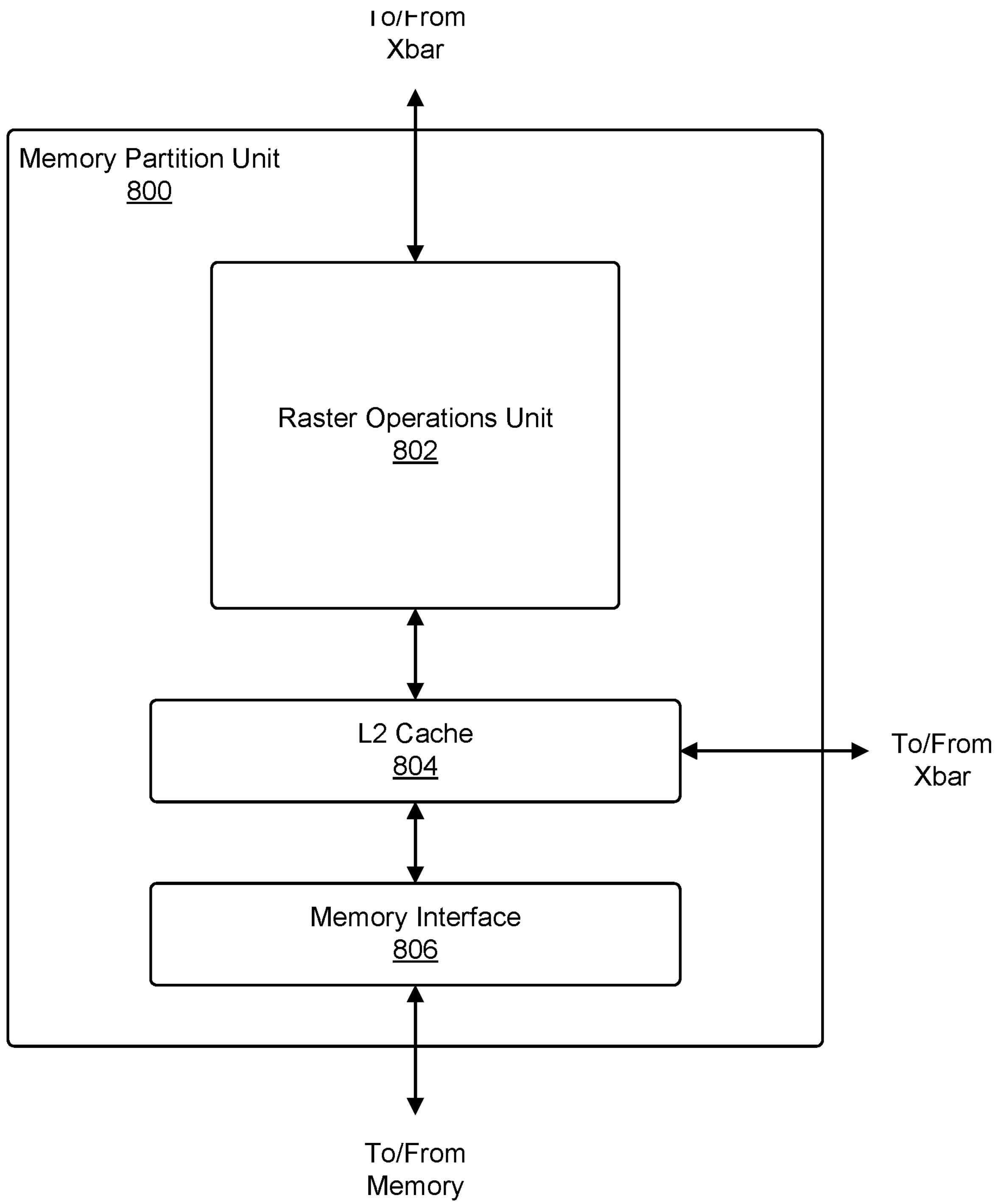
FIG. 8 illustrates an example of a memory partition unit, in accordance with one embodiment.

FIG. 8 illustrates a memory partition unit of a PPU, in accordance with one embodiment. In an embodiment, the memory partition unit 800 includes a Raster Operations ("ROP") unit 802; a level two ("L2") cache 804; a memory interface 806; and any suitable combination thereof. The memory interface 806 is coupled to the memory. Memory interface 806 may implement 32, 64, 128, 1024-bit data buses, or the like, for high-speed data transfer. In an embodiment, the PPU incorporates U memory interfaces 806, one memory interface 806 per pair of partition units 800, where each pair of partition units 800 is connected to a corresponding memory device. For example, PPU may be connected to up to Y memory devices, such as high bandwidth memory stacks or graphics double-data-rate, version 5, synchronous dynamic random access memory ("GDDR5 SDRAM").

In an embodiment, the memory interface 806 implements an HBM2 memory interface and Y equals half U. In an embodiment, the HBM2 memory stacks are located on the same physical package as the PPU, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory supports Single-Error Correcting Double-Error Detecting ("SECDED") Error Correction Code ("ECC") to protect data. ECC provides higher reliability for compute applications that are sensitive to data corruption. Reliability is especially important in large-scale cluster computing environments where PPUs process very large datasets and/or run applications for extended periods.

In an embodiment, the PPU implements a multi-level memory hierarchy. In an embodiment, the memory partition unit 800 supports a unified memory to provide a single unified virtual address space for CPU and PPU memory, enabling data sharing between virtual memory systems. In an embodiment the frequency of accesses by a PPU to memory located on other processors is trace to ensure that memory pages are moved to the physical memory of the PPU that is accessing the pages more frequently. In an embodiment, the high-speed GPU interconnect 608 supports address translation services allowing the PPU to directly access a CPU's page tables and providing full access to CPU memory by the PPU.

In an embodiment, copy engines transfer data between multiple PPUs or between PPUs and CPUs. In an embodiment, the copy engines can generate page faults for addresses that are not mapped into the page tables and the memory partition unit 800 then services the page faults, mapping the addresses into the page table, after which the copy engine performs the transfer. In an embodiment, memory is pinned (i.e., non-pageable) for multiple copy engine operations between multiple processors, substantially reducing the available memory. In an embodiment, with hardware page faulting, addresses can be passed to the copy engines without regard as to whether the memory pages are resident, and the copy process is transparent.

Data from the memory of FIG. 6 or other system memory is fetched by the memory partition unit 800 and stored in the L2 cache 804, which is located on-chip and is shared between the various GPCs, in accordance with one embodiment. Each memory partition unit 800, in an embodiment, includes at least a portion of the L2 cache 804 associated with a corresponding memory device. In an embodiment, lower level caches are implemented in various units within the GPCs. In an embodiment, each of the SMs 714 may implement a level one ("L1") cache wherein the L1 cache is private memory that is dedicated to a particular SM 840 and data from the L2 cache 804 is fetched and stored in each of the L1 caches for processing in the functional units of the SMs 714. In an embodiment, the L2 cache 804 is coupled to the memory interface 806 and the XBar 620.

The ROP unit 802 performs graphics raster operations related to pixel color, such as color compression, pixel blending, and more, in an embodiment. The ROP unit 802, in an embodiment, implements depth testing in conjunction with the raster engine 708, receiving a depth for a sample location associated with a pixel fragment from the culling engine of the raster engine 708. In an embodiment, the depth is tested against a corresponding depth in a depth buffer for a sample location associated with the fragment. In an embodiment, if the fragment passes the depth test for the sample location, then the ROP unit 802 updates the depth buffer and transmits a result of the depth test to the raster engine 708. It will be appreciated that the number of partition units 800 may be different than the number of GPCs and, therefore, each ROP unit 802 can, in an embodiment, be coupled to each of the GPCs. In an embodiment, the ROP unit 802 tracks packets received from the different GPCs and determines which that a result generated by the ROP unit 802 is routed to through the Xbar.

Figure 9:
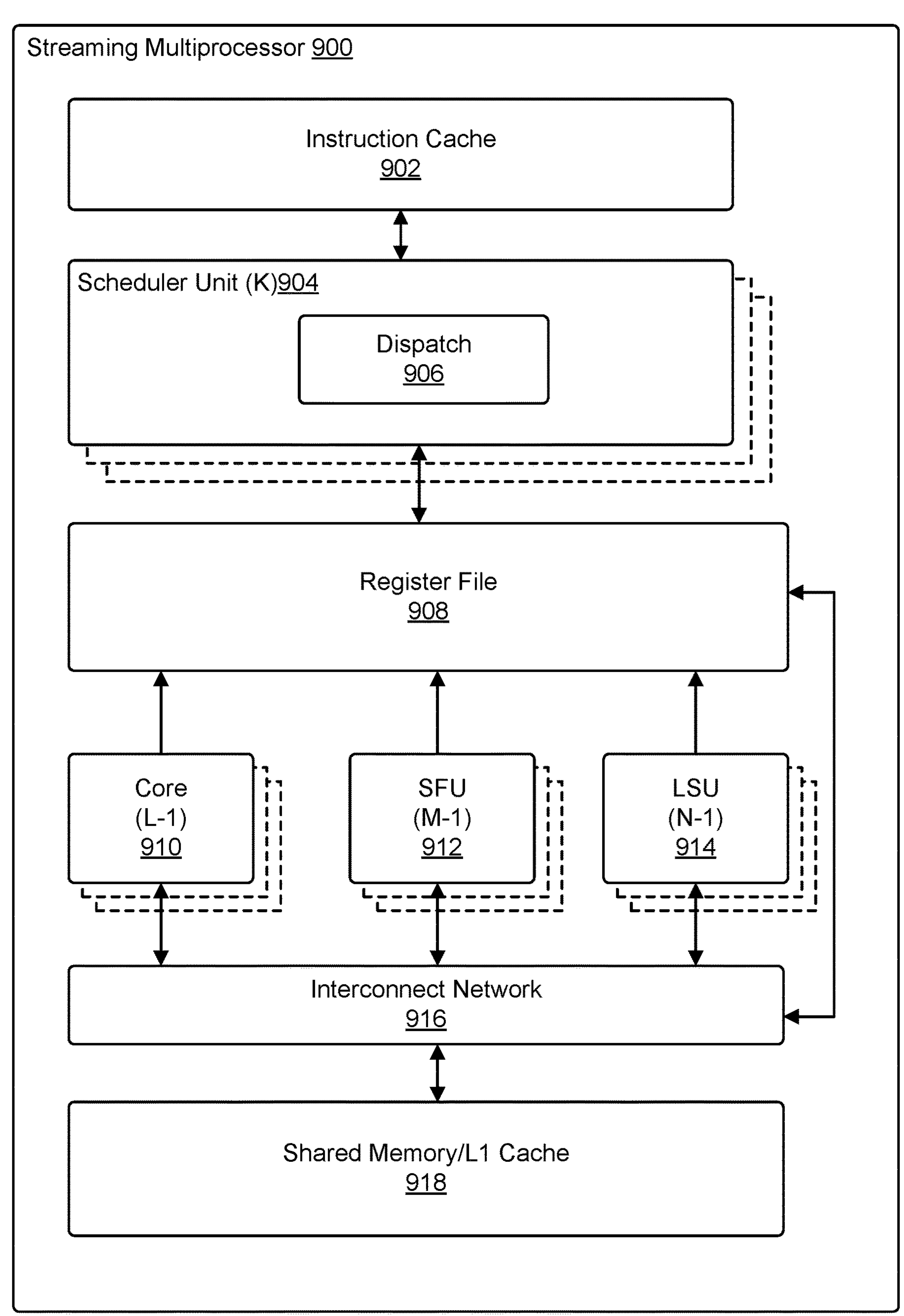
FIG. 9 illustrates an example of a streaming multi-processor, in accordance with one embodiment.

FIG. 9 illustrates a streaming multi-processor such as the streaming multi-processor of FIG. 7, in accordance with one embodiment. In an embodiment, the SM 900 includes: an instruction cache 902; one or more scheduler units 904; a register file 908; one or more processing cores 910; one or more special function units ("SFUs") 912; one or more load/store units ("LSUs") 914; an interconnect network 916; a shared memory/L1 cache 918; and any suitable combination thereof. In an embodiment, the work distribution unit dispatches tasks for execution on the GPCs of the PPU and each task is allocated to a particular DPC within a GPC and, if the task is associated with a shader program, the task is allocated to an SM 900. In an embodiment, the scheduler unit 904 receives the tasks from the work distribution unit and manages instruction scheduling for one or more thread blocks assigned to the SM 900. In an embodiment, the scheduler unit 904 schedules thread blocks for execution as warps of parallel threads, wherein each thread block is allocated at least one warp. In an embodiment, each warp executes threads. In an embodiment, the scheduler unit 904 manages a plurality of different thread blocks, allocating the warps to the different thread blocks and then dispatching instructions from the plurality of different cooperative groups to the various functional units (e.g., cores 910, SFUs 912, and LSUs 914) during each clock cycle.

Cooperative Groups may refer to a programming model for organizing groups of communicating threads that allows developers to express the granularity at which threads are communicating, enabling the expression of richer, more efficient parallel decompositions. In an embodiment, cooperative launch APIs support synchronization amongst thread blocks for the execution of parallel algorithms. In an embodiment, applications of conventional programming models provide a single, simple construct for synchronizing cooperating threads: a barrier across all threads of a thread block (e.g., the syncthreads ( ) function). However, programmers would often like to define groups of threads at smaller than thread block granularities and synchronize within the defined groups to enable greater performance, design flexibility, and software reuse in the form of collective group-wide function interfaces. Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In an embodiment, a dispatch unit 906 is configured to transmit instructions to one or more of the functional units and the scheduler unit 904 includes two dispatch units 906 that enable two different instructions from the same warp to be dispatched during each clock cycle. In an embodiment, each scheduler unit 904 includes a single dispatch unit 906 or additional dispatch units 906.

Each SM 900, in an embodiment, includes a register file 908 that provides a set of registers for the functional units of the SM 900. In an embodiment, the register file 908 is divided between each of the functional units such that each functional unit is allocated a dedicated portion of the register file 908. In an embodiment, the register file 908 is divided between the different warps being executed by the SM 900 and the register file 908 provides temporary storage for operands connected to the data paths of the functional units. In an embodiment, each SM 900 comprises a plurality of L processing cores 910. In an embodiment, the SM 900 includes a large number (e.g., 128 or more) of distinct processing cores 910. Each core 910, in an embodiment, includes a fully pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 910 include 64 single-precision (32-bit) floating point cores, 64 integer cores, 32 double-precision (64-bit) floating point cores, and 8 tensor cores.

Tensor cores are configured to perform matrix operations in accordance with an embodiment. In an embodiment, one or more tensor cores are included in the cores 910. In an embodiment, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices and the accumulation matrices C and D are 16-bit floating point or 32-bit floating point matrices. In an embodiment, the tensor cores operate on 16-bit floating point input data with 32-bit floating point accumulation. In an embodiment, the 16-bit floating point multiply requires 64 operations and results in a full precision product that is then accumulated using 32-bit floating point addition with the other intermediate products for a 4×4×4 matrix multiply. Tensor cores are used to perform much larger two-dimensional or higher dimensional matrix operations, built up from these smaller elements, in an embodiment. In an embodiment, an API, such as CUDA 9 C++ API, exposes specialized matrix load, matrix multiply and accumulate, and matrix store operations to efficiently use tensor cores from a CUDA-C++ program. In an embodiment, at the CUDA level, the warp-level interface assumes 16×16 size matrices spanning all 32 threads of the warp.

In an embodiment, each SM 900 comprises M SFUs 912 that perform special functions (e.g., attribute evaluation, reciprocal square root, and the like). In an embodiment, the SFUs 912 include a tree traversal unit configured to traverse a hierarchical tree data structure. In an embodiment, the SFUs 912 include texture unit configured to perform texture map filtering operations. In an embodiment, the texture units are configured to load texture maps (e.g., a 2D array of texels) from the memory and sample the texture maps to produce sampled texture values for use in shader programs executed by the SM 900. In an embodiment, the texture maps are stored in the shared memory/L1 cache. The texture units implement texture operations such as filtering operations using mip-maps (e.g., texture maps of varying levels of detail), in accordance with one embodiment. In an embodiment, each SM 900 includes two texture units.

Each SM 900 comprises N LSUs 914 that implement load and store operations between the shared memory/L1 cache 806 and the register file 908, in an embodiment. Each SM 900 includes an interconnect network 916 that connects each of the functional units to the register file 908 and the LSU 914 to the register file 908, shared memory/L1 cache 918 in an embodiment. In an embodiment, the interconnect network 916 is a crossbar that can be configured to connect any of the functional units to any of the registers in the register file 908 and connect the LSUs 914 to the register file and memory locations in shared memory/L1 cache 918.

The shared memory/L1 cache 918 is an array of on-chip memory that allows for data storage and communication between the SM 900 and the primitive engine and between threads in the SM 900 in an embodiment. In an embodiment, the shared memory/L1 cache 918 comprises 128 KB of storage capacity and is in the path from the SM 900 to the partition unit. The shared memory/L1 cache 918, in an embodiment, is used to cache reads and writes. One or more of the shared memory/L1 cache 918, L2 cache, and memory are backing stores.

Combining data cache and shared memory functionality into a single memory block provides improved performance for both types of memory accesses, in an embodiment. The capacity, in an embodiment, is used or is usable as a cache by programs that do not use shared memory, such as if shared memory is configured to use half of the capacity, texture and load/store operations can use the remaining capacity. Integration within the shared memory/L1 cache 918 enables the shared memory/L1 cache 918 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In an embodiment, fixed function graphics processing units are bypassed, creating a much simpler programming model. In the general purpose parallel computation configuration, the work distribution unit assigns and distributes blocks of threads directly to the DPCs, in an embodiment. The threads in a block execute the same program, using a unique thread ID in the calculation to ensure each thread generates unique results, using the SM 900 to execute the program and perform calculations, shared memory/L1 cache 918 to communicate between threads, and the LSU 914 to read and write global memory through the shared memory/L1 cache 918 and the memory partition unit, in accordance with one embodiment. In an embodiment, when configured for general purpose parallel computation, the SM 900 writes commands that the scheduler unit can use to launch new work on the DPCS.

In an embodiment, the PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In an embodiment, the PPU is embodied on a single semiconductor substrate. In an embodiment, the PPU is included in a system-on-a-chip ("SoC") along with one or more other devices such as additional PPUs, the memory, a reduced instruction set computer ("RISC") CPU, a memory management unit ("MMU"), a digital-to-analog converter ("DAC"), and the like.

In an embodiment, the PPU may be included on a graphics card that includes one or more memory devices. The graphics card may be configured to interface with a PCIe slot on a motherboard of a desktop computer. In yet another embodiment, the PPU may be an integrate graphics processing unit ("iGPU") included in the chipset of the motherboard.

Figure 10:
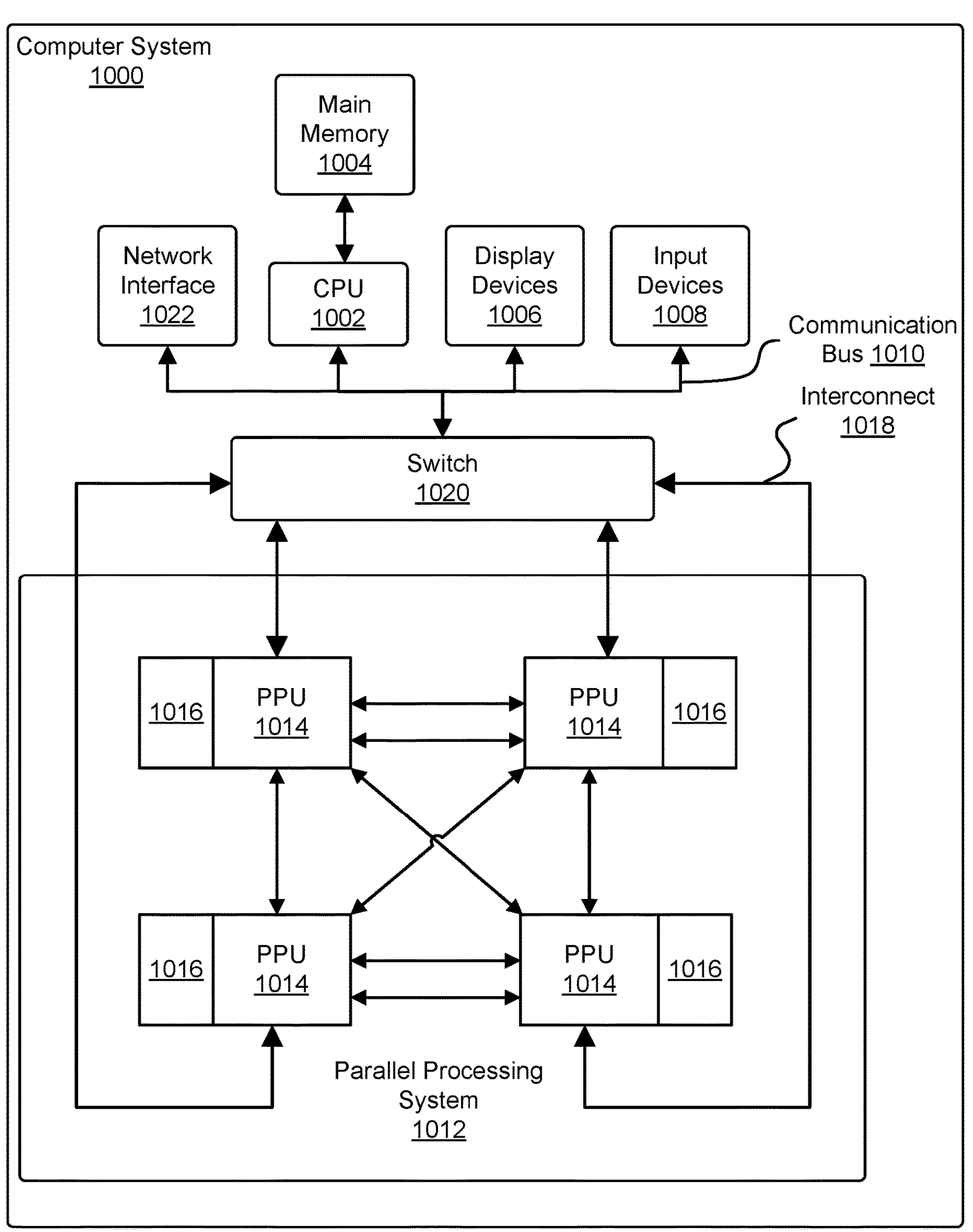
FIG. 10 illustrates a computer system in which the various examples can be implemented, in accordance with one embodiment.

FIG. 10 illustrates a computer system 1000 in which the various architecture and/or functionality can be implemented, in accordance with one embodiment. The computer system 1000, in an embodiment, is configured to implement various processes and methods described throughout this disclosure.

In an embodiment, the computer system 1000 comprises at least one central processing unit 1002 that is connected to a communication bus 1010 implemented using any suitable protocol, such as PCI (Peripheral Component Interconnect), PCI-Express, AGP (Accelerated Graphics Port), Hyper-Transport, or any other bus or point-to-point communication protocol(s). In an embodiment, the computer system 1000 includes a main memory 1004 and control logic (e.g., implemented as hardware, software, or a combination thereof) and data are stored in the main memory 1004 which may take the form of random access memory ("RAM"). In an embodiment, a network interface subsystem 1022 provides an interface to other computing devices and networks for receiving data from and transmitting data to other systems from the computer system 1000.

The computer system 1000, in an embodiment, includes input devices 1008, the parallel processing system 1012, and display devices 1006 which can be implemented using a conventional CRT (cathode ray tube), LCD (liquid crystal display), LED (light emitting diode), plasma display, or other suitable display technologies. In an embodiment, user input is received from input devices 1008 such as keyboard, mouse, touchpad, microphone, and more. In an embodiment, each of the foregoing modules can be situated on a single semiconductor platform to form a processing system.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit ("CPU") and bus implementation. Of course, the various modules may also be situated separately or in various combinations of semiconductor platforms per the desires of the user.

In an embodiment, computer programs in the form of machine-readable executable code or computer control logic algorithms are stored in the main memory 1004 and/or secondary storage. Computer programs, if executed by one or more processors, enable the system 1000 to perform various functions in accordance with one embodiment. The memory 1004, the storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In an embodiment, the architecture and/or functionality of the various previous figures are implemented in the context of the central processor 1002; parallel processing system 1012; an integrated circuit capable of at least a portion of the capabilities of both the central processor 1002; the parallel processing system 1012; a chipset (e.g., a group of integrated circuits designed to work and sold as a unit for performing related functions, etc.); and any suitable combination of integrated circuit.

In an embodiment, the architecture and/or functionality of the various previous figures is be implemented in the context of a general computer system, a circuit board system, a game console system dedicated for entertainment purposes, an application-specific system, and more. In an embodiment, the computer system 1000 may take the form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In an embodiment, a parallel processing system 1012 includes a plurality of PPUs 1014 and associated memories 1016. In an embodiment, the PPUs are connected to a host processor or other peripheral devices via an interconnect 1018 and a switch 1020 or multiplexer. In an embodiment, the parallel processing system 1012 distributes computational tasks across the PPUs 1014 which can be parallelizable—for example, as part of the distribution of computational tasks across multiple GPU thread blocks. In an embodiment, memory is shared and accessible (e.g., for read and/or write access) across some or all of the PPUs 1014, although such shared memory may incur performance penalties relative to the use of local memory and registers resident to a PPU. In an embodiment, the operation of the PPUs 1014 is synchronized through the use of a command such as _syncthreads( ) which requires all threads in a block (e.g., executed across multiple PPUs 1014) to reach a certain point of execution of code before proceeding.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered a system.

In the present document, references may be made to obtaining, acquiring, receiving, or inputting analog or digital data into a subsystem, computer system, or computer-implemented machine. The process of obtaining, acquiring, receiving, or inputting analog and digital data can be accomplished in a variety of ways such as by receiving the data as a parameter of a function call or a call to an application programming interface. In some implementations, the process of obtaining, acquiring, receiving, or inputting analog or digital data can be accomplished by transferring the data via a serial or parallel interface. In another implementation, the process of obtaining, acquiring, receiving, or inputting analog or digital data can be accomplished by transferring the data via a computer network from the providing entity to the acquiring entity. References may also be made to providing, outputting, transmitting, sending, or presenting analog or digital data. In various examples, the process of providing, outputting, transmitting, sending, or presenting analog or digital data can be accomplished by transferring the data as an input or output parameter of a function call, a parameter of an application programming interface or interprocess communication mechanism.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A processor, comprising:

one or more arithmetic logic units (ALUs) to identify an object in an image based, at least in part, on one or more neural networks including one or more non-adversarially trained portions and one or more adversarially trained portions, wherein the one or more adversarially trained portions are trained, at least in part, using adversarial training comprising:

calculating an error signal using an output of the one or more non-adversarially trained portions;

backpropagating the error signal through the one or more non-adversarially trained portions to modulate the error signal by the one or more non-adversarially trained portions, wherein configuration of the one or more non-adversarially trained portions is fixed during the adversarial training and not adjusted based on the back-propagated error signal; and providing the modulated error signal to update the one or more adversarially trained portions.

2. The processor of claim 1, wherein the one or more adversarially trained portions comprise an encoder and the one or more non-adversarially trained portions comprise a decoder.

3. The processor of claim 1, wherein the one or more adversarially trained portions map input data to a set of variables comprising a variable indicative of a probability of membership in a class and a variable indicative of appearance.

4. The processor of claim 1, wherein the one or more neural networks learn a manifold by training the encoder until a regulation threshold is met.

5. The processor of claim 1, wherein the one or more adversarially trained portions are trained based at least in part on an error signal calculated based on a difference between an adversarial example and a reconstruction of the adversarial example by the one or more non-adversarially trained portions.

6. The processor of claim 5, wherein the error signal is backpropagated to the one or more adversarially trained portions.

7. The processor of claim 1, wherein the non-adversarially trained portions comprise a decoder pre-trained to reconstruct examples based on a non-adversarial dataset representing objects to be identified.

8. The processor of claim 1, wherein the adversarially trained portions comprise an encoder trained using input from a decoder, the decoder pre-trained to reconstruct examples based on a non-adversarial dataset representing objects to be identified.

9. A system, comprising:

one or more computers including one or more processors to train one or more neural networks to identify an object in an image, the one or more neural networks comprising one or more non-adversarially trained portions and one or more adversarially trained portions, wherein the one or more adversarially trained portions are trained, at least in part, using adversarial training comprising:

calculating an error signal using an output of the one or more non-adversarially trained portions;

backpropagating the error signal through the one or more non-adversarially trained portions to modulate the error signal by the one or more non-adversarially trained portions, wherein configuration of the one or more non-adversarially trained portions is fixed during the adversarial training and not adjusted based on the back-propagated error signal; and providing the modulated error signal to update the one or more adversarially trained portions.

10. The system of claim 9, wherein the one or more adversarially trained portions comprise an encoder and the one or more non-adversarially trained portions comprise a decoder.

11. The system of claim 9, wherein the one or more adversarially trained portions map input data to variables comprising a variable indicative of class membership and variable indicative of an appearance code.

12. The system of claim 11, wherein the one or more non-adversarially trained portions reconstruct the input data based at least in part on the variables.

13. The system of claim 9, wherein the one or more neural networks learn a manifold regularized by training the encoder until a regulation criteria is met.

14. The system of claim 9, wherein the one or more adversarially trained portions are trained based at least in part on an error comprising a difference between an adversarially generated input and a reconstruction of the adversarially generated input by the non-adversarially trained portion.

15. The system of claim 14, wherein the error signal is modulated and back-propagated to the one or more adversarially trained portions.

16. A non-transitory machine-readable medium having stored thereon a set of instructions, which if performed by one or more processors, cause the one or more processors to at least:

cause one or more neural networks to be trained to identify an object in an image, the one or more neural networks including one or more non-adversarially trained portions and one or more adversarially trained portions, wherein the one or more adversarially trained portions are trained, at least in part, using adversarial training comprising:

calculating an error signal using an output of the one or more non-adversarially trained portions;

backpropagating the error signal through the one or more non-adversarially trained portions to modulate the error signal by the one or more non-adversarially trained portions, wherein configuration of the one or more non-adversarially trained portions is fixed during the adversarial training and not adjusted based on the back-propagated error signal; and providing the modulated error signal to update the one or more adversarially trained portions.

17. The non-transitory machine-readable medium of claim 16, wherein the one or more adversarially trained portions comprise an encoder and the one or more non-adversarially trained portions comprise a decoder.

18. The non-transitory machine-readable medium of claim 16, wherein the one or more adversarially trained portions map input data to a first variable indicative of class and a second variable indicative of appearance.

19. The non-transitory machine-readable medium of claim 18, wherein the one or more non-adversarially trained portions reconstruct the input data based at least in part on the first and second variables.

20. The non-transitory machine-readable medium of claim 16, wherein the one or more neural networks learn a regularized manifold, wherein the regularized manifold is regularized by training the encoder until a regulation criteria is met.

21. The non-transitory machine-readable medium of claim 16, wherein the one or more adversarially trained portions are trained based at least in part on an error signal calculated based on a difference between an adversarially generated input and a reconstruction of the adversarially generated input by the non-adversarially train portion.

22. The non-transitory machine-readable medium of claim 21, wherein the error signal is back-propagated to the one or more adversarially trained portions.

23. A system, comprising:

a camera; and at least one processor to identify a road sign based on input from the camera, the road sign identified based, at least in part, on one or more neural networks including one or more non-adversarially trained portions and one or more adversarially trained portions, wherein the one or more adversarially trained portions are trained, at least in part, using adversarial training comprising:

calculating an error signal using an output of the one or more non-adversarially trained portions;

backpropagating the error signal through the one or more non-adversarially trained portions to modulate the error signal by the one or more non-adversarially trained portions, wherein configuration of the one or more non-adversarially trained portions is fixed during the adversarial training and not adjusted based on the back-propagated error signal; and providing the modulated error signal to update the one or more adversarially trained portions.

24. The system of claim 23, wherein the identification of the road sign is resistant to an adversarial example comprising at least a threshold amount of difference from a corresponding non-adversarial example.

25. The system of claim 23, wherein the one or more non-adversarially trained portions are trained with images of the road sign.

26. The system of claim 23, wherein the one or more adversarially trained portions comprise an encoder and the one or more non-adversarially trained portions comprise a decoder.

27. The system of claim 23, wherein the one or more adversarially trained portions map input data to a set of latent variables comprising a probability variable and an appearance variable.

28. The system of claim 23, wherein the one or more adversarially trained portions are trained based at least in part on an error signal calculated based on a difference between an adversarially generated input and a reconstruction of the adversarially generated input by the non-adversarially trained portion.

29. The system of claim 28, wherein the error signal is backpropagated to the one or more adversarially trained portions.

30. The system of claim 23, wherein an adversarial attack is detected based at least in part on a comparison of an input to the one or more neural networks and the output of the one or more neural networks.

* * * * *